Dec. 21, 1937. M. W. GIESKIENG 2,102,695
RECORDING AND REPRODUCING OF ELECTRICAL IMPULSES
Filed Dec. 29, 1933
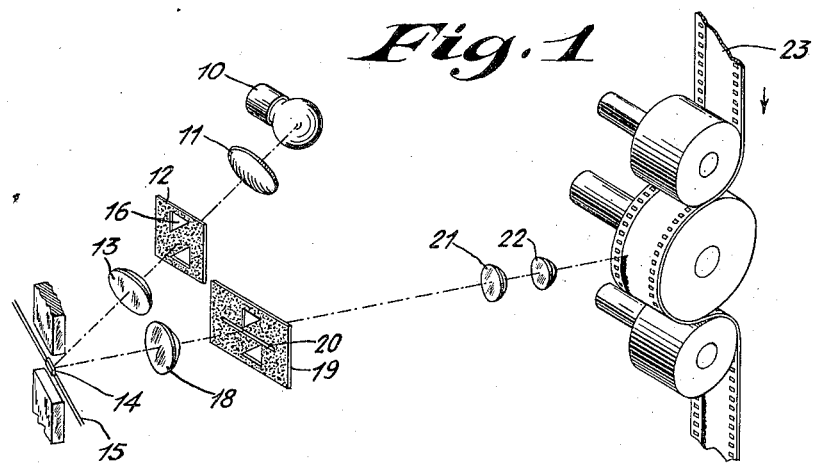
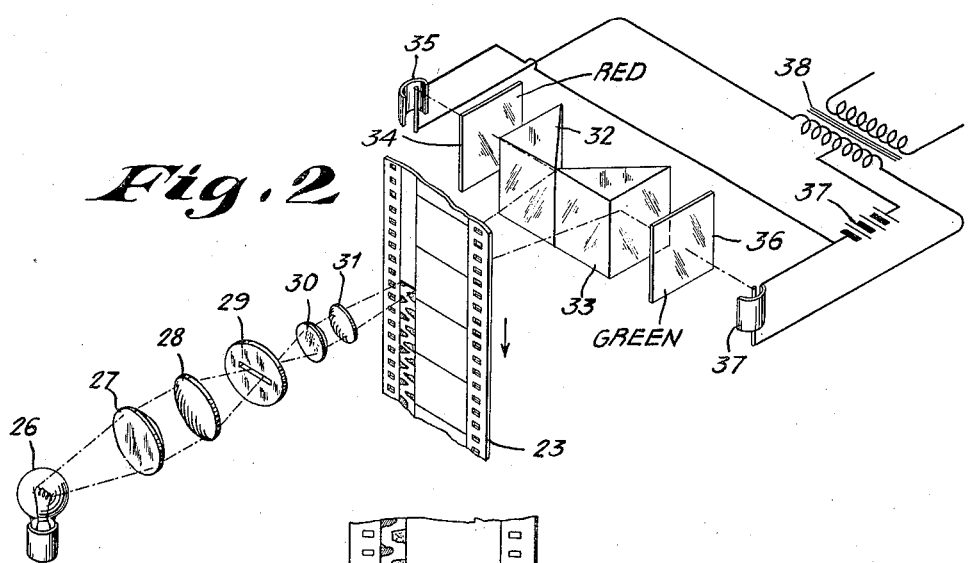
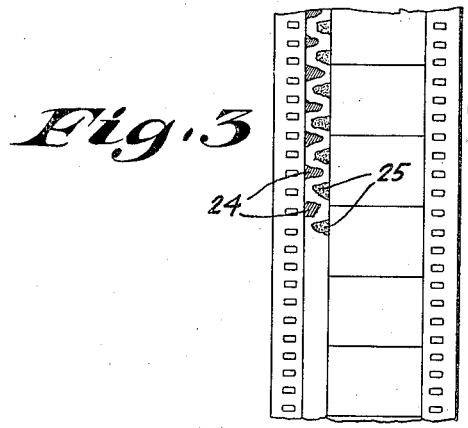
INVENTOR
MARION W. GIESKIENG
BY
ATTORNEY Patented Dec. 21, 1937

2,102,695

UNITED STATES PATENT OFFICE 2,102,695

RECORDING AND REPRODUCING OF ELECTRICAL IMPULSES

Marion W. Gieskieng, Little Rock, Ark., assignor to Radio Corporation of America, a corporation of Delaware Application December 29, 1933, Serial No. 704,445

2 Claims. (Cl. 179—100.3)

This invention relates to the indicating, recording and reproducing of electrical impulses, and has for its principal object the provision of an improved apparatus and method of operation whereby such impulses may be indicated or recorded on a relatively small area and whereby the positive and negative halves of the impulse waves may be selectively reproduced.

It is sometimes desirable in the recording or indicating of electrical impulses that the impulse record or indication be restricted to a smaller area than heretofore required. Thus in the case of a sound picture film, for example, it is desirable that the sound record or sound track be restricted to the minimum width consistent with satisfactory sound reproduction. Otherwise the proportion and symmetry of the picture is adversely affected, especially if the volume, amplitude, intensity or percentage modulation of the recorded sound varies over a considerable range.

In accordance with this invention, this difficulty is avoided and the range of recordable amplitudes is greatly increased by recording the positive and negative half waves of the impulses on the same longitudinal width of the recording surface. As hereinafter explained, these positive and negative half waves may be recorded in different colors such as green and red and the reproducer may include suitable means for selectively reproducing these differently colored half wave records.

The invention will be better understood from the following description when considered in connection with the accompanying drawing and its scope will be pointed out in the appended claims.

Referring to the drawing:

Fig. 1 is a diagrammatic representation of a recorder constructed in accordance with the invention, Fig 2 illustrates some details of a device suitable for reproducing the record made by the apparatus of Fig. 1, and Fig. 3 is an enlarged view of the improved record.

The impulse recorder of Fig. 1 includes a light source 10 from which light is projected through a lens 11, a shield 12 and a lens 13 to a mirror 14 mounted on the vibratory conductors 15 of a galvanometer or the like. It will be noted that the shield 12 is provided with a triangular opening 16 which may be covered with a screen adapted to pass only the red rays of the light and with a triangular opening 17 which may be covered with a screen adapted to pass only the green rays of the light. It will of course be understood that any other suitably colored screens may be selected for producing light beams of different color.

From the mirror 14, these differently colored light beams are reflected through a lens 18 to a shield 19 provided with a light slit 20. When no impulses are transmitted through the conductors 15, the light beams appear as indicated on the shield 19 and no light is transmitted through the slit 20. When the conductors 15 are subjected to electrical impulses, however, the mirror 14 is vibrated and light modulated in accordance with these impulses is transmitted through the lenses 21 and 22 to the photographic or light sensitive record 23 which may be moved longitudinally in the direction indicated by the arrow at the right of Fig. 1.

It will be evident that the modulated light reaching the recording surface 23 will consist of differently colored components, that these components are applied to the recording surface one after the other, and that one of these components represents the positive half waves of the impulses while the other represents the negative half waves of the same impulses. The resulting record is therefore a succession of alternate positive and negative half waves recorded linearly one after the other along the same longitudinal strip of recording surface. Due to the fact that these positive and negative half waves are sandwiched in between one another, the record may be reduced to one half the width customarily required or the recordable amplitude is doubled if the customary width is utilized.

Fig. 3 indicates the appearance of the record. In this figure, the positive half wave records produced by red light are indicated at 24 and the negative half wave records produced by green light are indicated at 25.

Fig. 2 illustrates an apparatus suitable for reproducing this record. This reproducing apparatus includes a light source 26 from which light is projected through lenses 27 and 28, the light slit of shield 29, the lenses 30 and 31 and the record 23 to a pair of oppositely disposed prisms 32 and 33. From the angularly disposed surface of the prism 32, light is reflected through a red color filter 34 to a photo-electric or other suitable light responsive device 35. From the similar surface of the prism 33 light is reflected through a green color filter 36 to a light responsive device 37.

For convenience in illustration, the prisms 32 and 33, the filters 34 and 36 and the photo-electric devices 35 and 37 have been shown as alined in a direction transverse to the record strip but it will be apparent that these various elements are preferably alined longitudinally of this strip i. e. rotated about the optical axis through an angle of 90 degrees. While specific reference has been made to red and green color screens or filters, it will be apparent that any suitable colors may be utilized, a yellow filter being preferred in case the photo-electric cell is of the potassium type as distinguished from the caesium and rubidium types.

The light responsive devices 35 and 37 are connected through a current source 37 to a transformer 38 which is adapted to be connected to the input circuit of a vacuum tube amplifier or the like in a manner well understood by those skilled in the art.

It will, of course, be apparent that various other types of means may be provided for splitting the light into its differently colored components. For example, the prisms 32 and 33 and the filters 34 and 36 may be replaced by a single prism so arranged as to separate the color bands, the photocell 35 being arranged to receive the red band and the photocell 37 being arranged to receive the green band.

I claim:

1. The method which includes producing a light beam having differently colored components, modulating one of said components in accordance with only the positive half waves of the impulses to be recorded, modulating another of said components in accordance with only the negative half waves of said impulses and photographically recording said components in alinement in their respective colors.

2. The combination of means for producing a pair of oppositely directed triangularly shaped differently colored light beams alined with one another in a predetermined direction, a reflecting surface arranged to be vibrated in said direction in accordance with a series of electrical impulses, a shield provided with a light slit arranged to be alternately illuminated by said beams, means for imaging said beams on said slit, and a recording surface movable transversely of the modulated light transmitted through said slit.

MARION W. GIESKIENG.